No. 845,218. PATENTED FEB. 26, 1907.
G. F. CONNER.
CLEANING WHEEL FOR ROOT HARVESTING MACHINES.
APPLICATION FILED APR. 7, 1906.

3 SHEETS—SHEET 1.

Witnesses:

Inventor:
George F. Conner
by Clement R. Stickney
Attorney.

THE NORRIS PETERS CO., WASHINGTON, D. C.

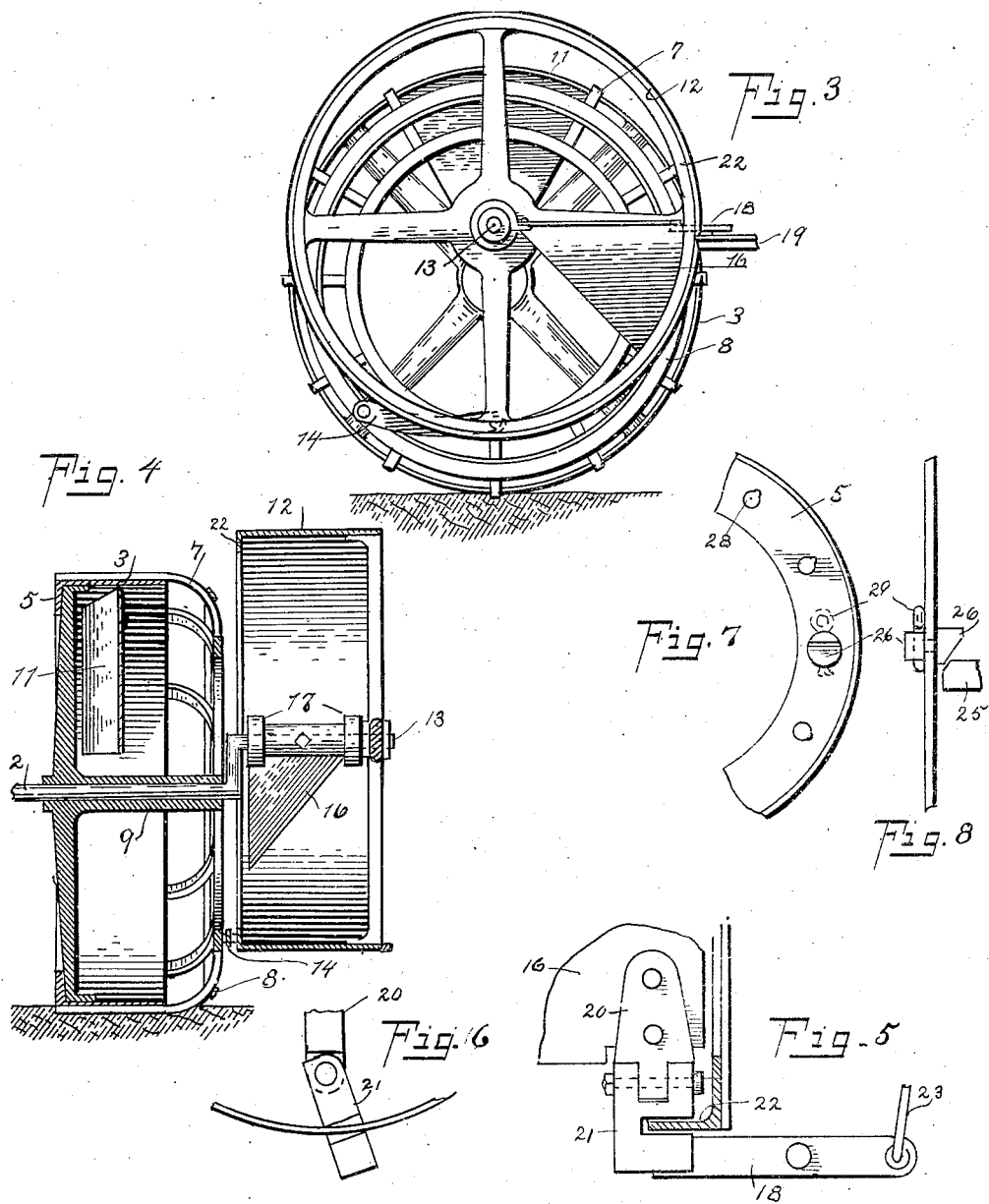

No. 845,218. PATENTED FEB. 26, 1907.
G. F. CONNER.
CLEANING WHEEL FOR ROOT HARVESTING MACHINES.
APPLICATION FILED APR. 7, 1906.

3 SHEETS—SHEET 3.

Witnesses:
E. S. Moak
H. Scott

Inventor:
George F. Conner
by Clement R. Stickney
Attorney

UNITED STATES PATENT OFFICE.

GEORGE F. CONNER, OF PORT HURON, MICHIGAN.

CLEANING-WHEEL FOR ROOT-HARVESTING MACHINES.

No. 845,218.  Specification of Letters Patent.  Patented Feb. 26, 1907.

Application filed April 7, 1906. Serial No. 310,534.

*To all whom it may concern:*

Be it known that I, GEORGE F. CONNER, a citizen of the United States of America, and a resident of the city of Port Huron, county of St. Clair, and State of Michigan, have invented certain new and useful Improvements in Cleaning-Wheels for Root-Harvesting Machines, of which the following is a full, clear, and exact specification.

In beet-harvesters, potato-diggers, and the like it is desirable to thoroughly rumble the beets or other roots and deliver them from the machine ready for picking up and free from any dirt or other matter. It is also convenient to have them clear of the return-path of the machine across the field and also to distribute them symmetrically, so that a wagon may be readily driven to the heaps with the least loss of time and travel. Inasmuch as the power available to drive or draw a machine of the kind indicated is limited by the working conditions it is also necessary that the running parts be as few in number and light in weight as possible.

This invention relates to means which may be attached to or made a part of a beet-harvester, potato-puller, or the like for rumbling and cleaning the beets or other vegetables without adding an objectionable number of working or running parts to the machine and which becomes a part of the tractive or bearing mechanism, which delivers the beets, &c., cleaned for transportation out of the path of the machine and in symmetrical order, and which while under the manual control of the operator is normally automatic in its action.

The invention consists in the matters hereinafter set forth, and more particularly pointed out in the appended claims.

Figure 1:
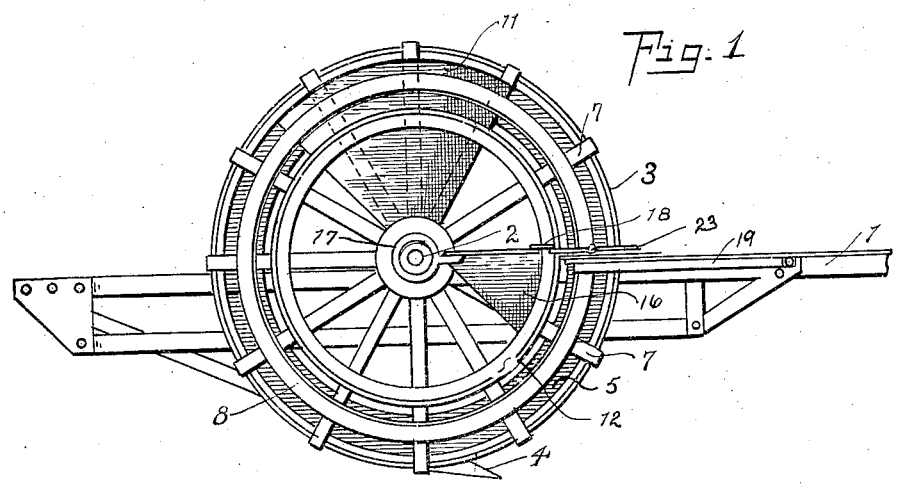
Figure 2:
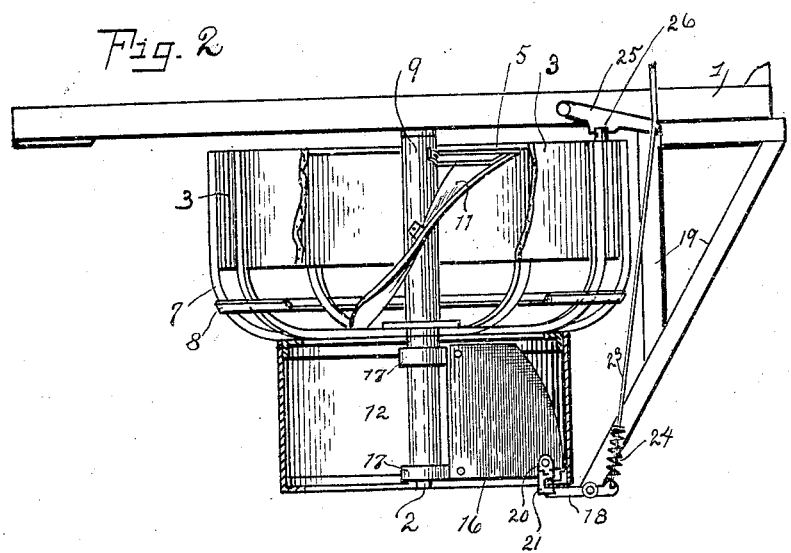
Figure 9:
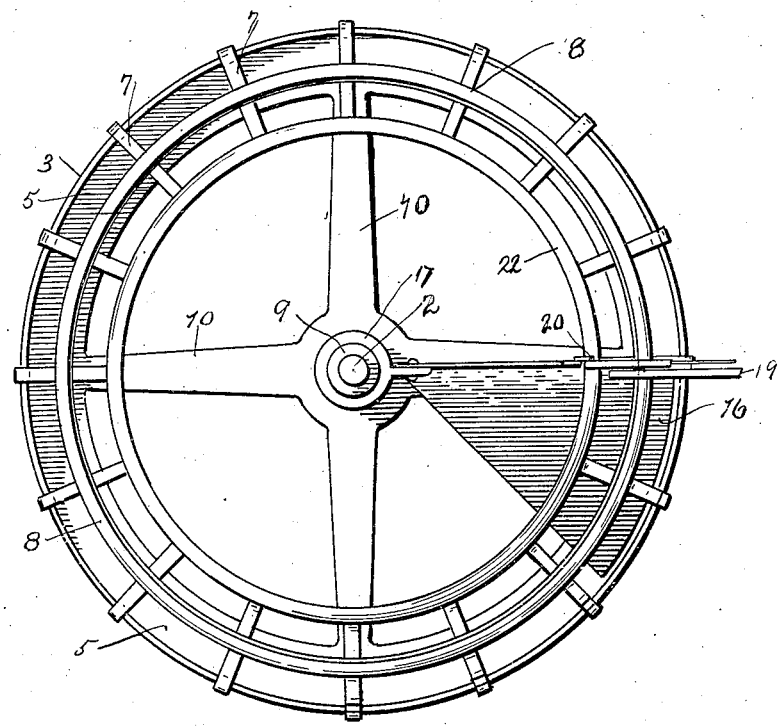
Figure 10:
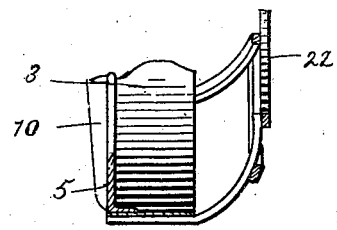

In the drawings, Figure 1 is a view in side elevation of a rumbler which embodies the features of the invention, acting as a bearing-wheel or traction-wheel for the frame of a root-harvester of any preferred type. Fig. 2 is a plan view of the rumbler, partially in section and partially broken away to give an interior view, with the side member of the machine-frame. Fig. 3 is a view in side elevation of a rumbler of different form. Fig. 4 is a view in vertical central section of the rumbler illustrated in Fig. 3. Fig. 5 is a view in detail of a clutch for a clearing-blade in the rumbler. Fig. 6 is a detail view of the clutch in engagement with the rumbler-flange. Fig. 7 is a detail view of a flange and a knock-off pin. Fig. 8 is a further detail view of the flange and knock-off pin. Fig. 9 is a view in elevation of a single-barrel rumbler. Fig. 10 is a view in detail of the rim of the latter form of rumbler.

Referring to the drawings, 1 represents the main frame of a beet-harvester, potato-lifter, or the like provided with a shaft 2. A wheel is operatively secured thereon, which may either be simply a bearing-wheel or else by proper connections be a traction-wheel, the rim 3 of which is internally flanged at each margin, so as to retain vegetables, which may be delivered into the wheel by the operating member of the machine—as, for example, beet-pullers 4. The flange 5, adjacent the operating members, is preferably perpendicular to the rim, so that the wheel may run close to the operating or delivering members, and may be perforate or solid, as preferred. The other rim-flange is preferably perforate or open-work, in which case it should be outwardly curved or dished to allow the dirt to escape past the rim, whose width is determined by the space available between the rows of vegetables on which the machine is adapted to work. A suitable construction for the outer rim comprises outwardly-curved radial members 7 and an annular bar 8 secured thereon. Said radial members may be continued to the hub 9 of the wheel as spokes, or spokes 10, of a design to permit vegetables to be passed between them into the wheel-rim, may be secured to the other margin of the rim and the corresponding end of the hub, this offsetting of the spokes permitting the vegetables to roll freely around the inside of the rim.

To discharge the contents of the wheel, a clearing-blade 11, set obliquely after the manner of a propeller, extends inwardly from the rim, its helical surface being adjusted to lift the contents up and out over the outer flange as it revolves with the wheel. If the wheel is to be discharged at every revolution, the clearing-blade may be permanently secured in the rim.

To increase the carrying capacity and lengthen the cleaning or rumbling process, a drum 12 may be secured to the discharge-face of the wheel. Said drum may be of less diameter than the wheel, so that its periphery clears and does not crush the tops of plants in the row just outside the wheel, in which case it is concentrically secured to the wheel itself, and the wheel-spokes are placed on the outer end of the wheel-hub to readily carry the drum, or the drum may be of equal or greater diameter, in which instance it is journaled on an offset arm 13 of the main shaft, so that its outer face turns clear of the ground, and its inner or receiving end is in such relation to the outer flange of the wheel that the wheel-clearing blade lifts the contents into the drum while passing through the lower part of its revolution, motion being given the drum by any appropriate means— as, for intsance, a link 14, pivoted at one end to the drum and the other to the wheel. A fixed clearing-blade in the drum, similar to that of the wheel, may be used for dumping its contents at each revolution.

To vary the interval of discharge, and as a preferred construction, a movable helical blade 16 is journaled by suitable bearings 17 on the drum-hub or an extension of the wheel-hub or bearing-shaft within the drum. This is held, when at rest, above the contents of the drum, which rolls and tumbles along the lower segment of the drum-rim. As a simple method of doing this a clutch, adapted to grip the outer margin of the rim of the drum, may be fastened to the outer edge of the blade 16 so as to be intercepted by and lie on a movable stop or trigger 18, which in turn is suitably secured on an outlying portion 19 of the machine-frame. The clutch comprises in the preferred construction a member 20, secured suitably to the blade 16, and an outer member 21, hinged thereto by a rule-joint which breaks down. The said outer member is transversely slotted, so as to embrace the radial flange 22 of the drum-rim, which passes freely therethrough when the clutch is straight. When the stop 18 is withdrawn, the rule-joint breaks down, and the slotted clutch grips the flange and rides round with it until intercepted and released by the stop.

The stop 18 is operated by suitable means, as by a link 23, which is brought within operative reach of the driver. A spring 24 returns the stop to place. To provide for the automatic discharge of the drum at regular intervals, as well as its manual control by the operator, the inner end of the stop-link 23 may be pivoted to a lever 25, which is adapted to be periodically oscillated by a knock-off pin 26. Said pin, where it is desired to discharge the barrel or drum at greater intervals than a drum revolution, may be carried by any intermediate gearing or other moving part of the machine affording the proper motion. Otherwise it may be secured in the inner flange 5 of the wheel-rim.

When the wheel or drum is set so as to discharge automatically at regular intervals as it passes down the field, and is then turned round for its return trip up the next row, the drum or wheel may not discharge its contents in symmetrical relation to the regularly-disposed piles left on the down trip. To avoid this and leave the heaps of vegetables on the field in the most convenient order for loading, the knock-off pin 26 may be shifted by the operator along the moving member to which it is attached, so as to bring the discharge at the proper time. A convenient arrangement is to shift the knock-off pin to the proper one of a series of holes 28 in the wheel-flange, a cotter-pin 29 or other readily-adjusted means holding it in place. An intermittently-movable blade, secured as in the drum and provided with a similar clutch and other operating means, may be used for a wheel without the drum, as in Fig. 9, the intermittent discharge being obtained as in the drum.

One of the advantages of a cleaning-wheel of this design is its adjustability to different classes of machines without adding to their working parts. Its diameter may be made the same as that of the regular bearing or traction wheels, for one of which it may be readily substituted. Its capacity depends on the size of the barrel or drum, which is independent of the size of the wheel. Another feature is its combined automatic and manually-controlled discharge, by which its contents may be dumped as desired by the operator, while the shifting of the automatic clutch enables the contents of the wheel to be distributed in the most convenient and accessible manner for loading.

The cleaning process may be lengthened or shortened to accommodate different working conditions, so that the vegetables may be thoroughly cleaned irrespective of wet, clinging, or lumpy soil.

The design of the different parts may be made to conform to the best practice for the use intended, and the mechanical details may be varied to meet any requirements of service.

I claim as my invention—

1. A cleaning-wheel and automatic means for discharging the contents of the wheel, adjustable for varying the period and frequency of discharge.

2. A cleaning-wheel, automatic means for discharging the contents of said wheel, and adjusting means for varying the period and frequency of operation of said automatic means.

3. A cleaning-wheel, means for intermittently discharging the contents of the wheel, means automatically operating the discharging means, and means for changing the period of discharge.

4. A cleaning-wheel, means for intermittently discharging the contents of the wheel, means for both manually and automatically operating the discharging means, and means for varying the period of the automatic action of the operating means.

5. A bearing-wheel, side-delivery rumbler, means within the rumbler for discharging its contents, and means for automatically operating said discharging means, adjustable for varying the period and frequency of discharge.

6. A rumbler comprising a receiving and rumbling bearing-wheel, and a cleaning-drum adjacent the delivery side of the wheel, said wheel discharging below its horizontal, axial plane into the drum.

7. A rumbler comprising a receiving and rumbling bearing-wheel, and a cleaning-drum rotated by the wheel, adjacent the delivery side of the wheel, said wheel discharging below its horizontal axial plane into the drum.

8. A rumbler comprising a receiving and rumbling bearing-wheel, a cleaning-drum in longitudinal alinement therewith, means for discharging the contents of the wheel directly into the drum below the horizontal, axial plane of the wheel, and means for periodically discharging the contents of the drum.

9. A rumbler comprising side-delivery, receiving and rumbling wheel, and a cleaning-drum carried thereby, said wheel discharging directly into the drum below the horizontal, axial plane of the wheel.

10. A rumbler comprising a receiving and rumbling bearing-wheel, a cleaning-drum, means for delivering the contents of the wheel into the drum periodically, means for discharging the contents of the drum normally at rest, and means for periodically operating the drum-discharging means.

11. A rumbler comprising a receiving and rumbling bearing-wheel, a cleaning-drum, means for discharging the contents of the wheel into the drum, and discharging means in the drum, moved intermittently thereby.

12. A rumbler comprising a receiving and rumbling bearing-wheel, a cleaning-drum receiving the contents of the wheel, discharging means for the rumbler, and means intermittently operating the discharging means.

13. A rumbler comprising a receiving and rumbling bearing-wheel, a cleaning-drum receiving the contents of the wheel, discharging means for the rumbler, means for intermittently operating the discharging means, and means for changing the period of action of the operating means relative to the period of revolution of the rumbler.

14. A rumbler comprising a receiving and rumbling bearing-wheel, a cleaning-drum receiving the contents of the wheel, discharging means for the rumbler, means automatically operating the discharging means at regular intervals, and means for discharging the rumbler independently of the automatically-operating means.

15. A rumbler provided with discharging means, and means for intermittently operating the discharging means, adjustable for varying the period and moment of discharge in relation to the revolution of the rumbler.

16. In a rumbler, means for discharging the contents thereof normally at rest, and means for intermittently operating the discharging means, having adjusting members for varying the period and time of action.

17. A rumbler comprising a side-delivery receiving and rumbling bearing-wheel, a cleaning-drum receiving the contents of the wheel, and means normally independent of the drum for discharging the rumbler at predetermined intervals.

18. In a rumbler, a clearing member within the rumbler, and means for intermittently operating the clearing member comprising a member adapted to detachably interlock the rumbler and clearing member, and a member adapted to disengage the interlocking member and rumbler.

19. In a rumbler, a clearing-blade adapted to discharge the contents of the rumbler at one end thereof, and means intermittently interlocking the blade with the rumbler.

20. In a rumbler, a clearing-blade normally at rest within the rumbler, a clutch on the blade detachably engaging the rumbler, and means for intermittently tripping the clutch.

21. In a rumbler, a floating clearing-blade within the rumbler, a clutch detachably interlocking the blade and the rumbler, means for automatically tripping the clutch, and means for tripping the clutch independently of the automatic operating means.

22. In a rumbler, an oblique clearing-blade journaled therein, a clutch detachably interlocking the blade and rumbler, a trip for the clutch and an adjustably-secured knock-off intermittently operating the trip.

23. A side-delivery, bearing-wheel rumbler provided with a clearing-blade journaled therein, a clutch detachably interlocking the rumbler and blade, and a trip for intermittently engaging the clutch, provided with both manual and automatic operating means.

24. A rumbler comprising a receiving and rumbling bearing-wheel consisting of a hub, a rim, spokes from the hub secured to one margin of the rim, curved outwardly at their outer extremities beyond the plane of the rim-margin, and a helical clearing-blade extending from the rim toward the hub, and a cleaning-drum adjacent the delivery side of the wheel, said wheel discharging below its horizontal, axial plane into the drum.

25. A rumbler comprising a receiving and bearing wheel consisting of a rim, a hub, spokes connecting one margin of the rim and hub, adapted to form an open-work retaining-flange curved outwardly beyond the tread of the rim, and a helical clearing-blade between the hub and the rim, and a cleaning-drum adjacent the delivery side of the wheel, said wheel discharging into the drum below its horizontal, axial plane.

In testimony whereof I have hereunto set my name in the presence of the subscribing witnesses.

GEORGE F. CONNER.

Witnesses:
E. L. MOAK,
H. SCOTT.